US008714516B2

(12) United States Patent
Maercovich et al.

(10) Patent No.: US 8,714,516 B2
(45) Date of Patent: May 6, 2014

(54) NON-ADJUSTABLE WATER PRESSURE AND FLOW SPEED REGULATING FLUSH SYSTEM

(75) Inventors: Jorge Maercovich, Woodland Hills, CA (US); Leo Maercovich, Woodland Hills, CA (US)

(73) Assignee: Advanced Modern Technologies Corporation, Woodland Hills, CA (US)

(*) Notice: Subject to any disclaimer, the term of this patent is extended or adjusted under 35 U.S.C. 154(b) by 443 days.

(21) Appl. No.: 12/583,140

(22) Filed: Aug. 14, 2009

(65) Prior Publication Data
US 2011/0037011 A1     Feb. 17, 2011

(51) Int. Cl.
*F16K 31/12* (2006.01)
(52) U.S. Cl.
USPC ............... 251/40; 251/33; 251/126; 138/42; 137/808
(58) Field of Classification Search
USPC ............ 138/42; 251/14, 40, 33, 48, 126; 137/808
See application file for complete search history.

(56) References Cited

U.S. PATENT DOCUMENTS

| 1,858,470 | A * | 5/1932 | Sloan | 251/21 |
|---|---|---|---|---|
| 4,202,525 | A * | 5/1980 | Govaer et al. | 251/40 |
| 4,227,551 | A * | 10/1980 | Hawkins et al. | 138/40 |
| 4,284,105 | A * | 8/1981 | Moked et al. | 138/42 |
| 4,387,878 | A * | 6/1983 | Zukausky | 251/30.03 |
| 5,295,655 | A * | 3/1994 | Wilson et al. | 251/40 |
| 6,000,674 | A * | 12/1999 | Cheng | 251/26 |
| 6,019,343 | A * | 2/2000 | Tsai | 251/40 |
| 6,227,219 | B1 * | 5/2001 | Pino | 251/40 |
| 6,260,576 | B1 * | 7/2001 | Allen | 251/40 |
| 6,616,119 | B2 * | 9/2003 | Wilson | 251/40 |
| 6,659,420 | B2 * | 12/2003 | Hwang et al. | 251/26 |
| 6,840,496 | B2 * | 1/2005 | Maercovich et al. | 251/40 |
| 6,845,524 | B2 * | 1/2005 | Hwang | 4/304 |
| 2003/0178591 | A1 * | 9/2003 | Hwang et al. | 251/26 |
| 2008/0060712 | A1 * | 3/2008 | Gluzman et al. | 138/39 |
| 2008/0072969 | A1 * | 3/2008 | Maercovich | 137/455 |

* cited by examiner

*Primary Examiner* — Eric Keasel
(74) *Attorney, Agent, or Firm* — Raymond Y. Chan; David and Raymond Patent Firm

(57) ABSTRACT

A non-adjustable water pressure and flow speed regulating flushing system includes a valve member adapted for sealedly disposing between the water inlet and outlet to control water flowing from water inlet to outlet through the water chamber, a relief valve disposed within the water chamber for controlling the water flowing from water chamber to water outlet, and a flow speed regulation arrangement which includes an elongated bleed channel for controlling a water pressure between the water inlet and water chamber, so as to regulate a flow speed of the water entering into the water chamber through the bleed channel in a non-adjustable manner.

28 Claims, 7 Drawing Sheets

NON-ADJUSTABLE WATER PRESSURE AND FLOW SPEED REGULATING FLUSH SYSTEM

BACKGROUND OF THE PRESENT INVENTION

1. Field of Invention

The present invention is generally related to a flush system, and more particularly to a non-adjustable water pressure and flow speed regulating flush system for restricting an inletting speed of the water flow to the chamber of the system so as to avoid the over-flush of the system.

2. Description of Related Arts

Normally, the flushing system comprises a water inlet, water outlet, and a valve member for controlling the water flowing between the water inlet and water outlet. The valve member comprises a relief valve adapted for sealedly controlling the water flow from a water chamber to the water outlet. The valve member also utilizes a flexible diaphragm to controllably seal the connection between the water inlet and the water chamber in a water pressure balancing manner.

Conventionally, the flexible diaphragm is sealed within the water chamber to control the water pressure therewithin. When the relief valve is opened, water within the chamber is released to the water outlet. In other words, the relief valve is actuated to release the water pressure in the water chamber and to allow the water in the water chamber to pass through a valve barrel to the water outlet, so as to start each flushing cycle. At the time when the water pressure within the water chamber is reduced, the flexible diaphragm is moved to enable the water passing to the water chamber from the water inlet so as to balance the water pressure between the water chamber and the water inlet. In particular, a bleed hole is formed at the flexible diaphragm to communicate the water chamber with the water inlet. Therefore, when the water pressure within the water chamber is lesser than the water pressure at the water inlet, the flexible diaphragm will pop to allow the water entering into the water chamber from the water inlet through the bleed hole until the water pressure at the water chamber balances with the water pressure at the water inlet.

Accordingly, at the operatively opened position of the relief valve when it is being actuated, the relief valve allows the water in the water chamber passing through the valve barrel to the water outlet, so as to release the water pressure in the water chamber. Thus, the flexible diaphragm is upwardly moved to adjustably allow the water passing through the bleed hole from the water inlet to the water chamber since the water pressure in the water inlet is greater than the water pressure at the water chamber, so as to re-balance the water pressure.

At a closed position of the relief valve, the water pressure in the water inlet is communicated to the water chamber through the bleed hole of the flexible diaphragm in a balance manner. Since the water pressure in the water chamber is normally greater than the water pressure at the water outlet, the flexible diaphragm is moved back to its original configuration to complete the flushing cycle.

The flexible diaphragm also plays an importance role as buffering the impact change of water pressure between the water inlet and the water chamber via downward and upward movement. The bleed hole of the flexible diaphragm is a common way for balancing the water pressure between the water inlet and the water chamber and mostly provided at an outer peripheral movable portion of the flexible diaphragm for communication between the water inlet and the water chamber. A valve seat provided for holding the relief valve in position is provided at a center immovable portion of the diaphragm to fixedly mount therewith in a coaxial manner.

There are several drawbacks of the existing valve members. The conventional method is to provide the bleed hole at the outer movable portion of the flexible diaphragm. The outer movable portion is frequently moved in accordance with the changing of water pressure that pops each time of the flushing cycle. The bleed hole at the outer movable portion of the flexible diaphragm tends to be easily broken due to the frequent movement of the flexible diaphragm.

The impact of the water flow from water inlet to the water chamber through the bleed hole due to the water pressure changing is also another reason resulting in the shortening service life span of the flexible diaphragm. In other words, the inletting speed of the water entering into the water chamber through the bleed hole will be substantially increased to cause the over-flush of the flushing system.

For the environmental issue, a diameter of the bleed hole at the outer flexible diaphragm can be easily adjusted to make a bigger bleed hole, wherein the flexible diaphragm with the bigger bleed hole will cause relatively larger amount of water in each flushing cycle.

SUMMARY OF THE PRESENT INVENTION

A main object of the present invention is to provide a non-adjustable water pressure and flow speed regulating flush system for restricting an inletting speed of the water flow to the chamber of the system so as to avoid the over-flush of the system.

Another object of the present invention is to provide a non-adjustable water pressure and flow speed regulating flushing system, which comprises a flow speed regulation arrangement having an elongated bleed channel for regulating the water flow pressure and flow speed from the water inlet to water outlet through a water chamber in a non-adjustable manner.

Another object of the present invention is to provide a non-adjustable water pressure and flow speed regulating flushing system, wherein the bleed channel has a uniform diameter extended from a first opening at the water inlet to a second opening to the water chamber, so as to non-adjustably regulate the water flow.

Another object of the present invention is to provide a non-adjustable water pressure and flow speed regulating flushing system, wherein an elongated water conduit is extended between the first opening and the second opening, wherein the water conduit has a predetermined length and diameter, so as to balance the water pressure between the water inlet and the water chamber in a non-adjustable manner.

Another object of the present invention is to provide a non-adjustable water pressure and flow speed regulating flushing system, wherein the elongated water conduit has a curved configuration extended from the water inlet to the water chamber, so as to restrict the water speed.

Another object of the present invention is to provide a non-adjustable water pressure and flow speed regulating flushing system, wherein the valve member comprises a sealing diaphragm for normally blocking the water flow from water inlet to water chamber, and a valve seat for holding the relief valve in position having a guiding slot for guiding the bleed channel extended from the water chamber to the water inlet, so as to retain the guiding slot in position.

Another object of the present invention is to provide a non-adjustable water pressure and flow speed regulating flushing system, wherein the first opening of the bleed channel is extended at the center immovable portion of the diaphragm, which has less movement than an outer peripheral movable portion, to communicate with the water inlet, so as to enhance the durability of the valve member.

Another object of the present invention is to provide a non-adjustable water pressure and flow speed regulating flushing system, wherein the second opening of the bleed channel is extended to the valve seat for communicating with the water chamber, so that when the diaphragm is moved via a variety of water pressure, the bleed channel is approximately remaining at the same position.

Another object of the present invention is to provide a non-adjustable water pressure and flow speed regulating flushing system, wherein the bleed channel is extended to a valve platform to a valve barrel of the valve seat through the center immovable portion of the diaphragm to communicate with the water inlet and water chamber, so as to prolong the life of valve member.

Accordingly, in order to accomplish the above objects, the present invention provide a non-adjustable water pressure and flow speed regulating flushing system having a water inlet and water outlet, comprising:

a valve member, having a water chamber, adapted for sealedly disposing between the water inlet and the water outlet to control water flowing from the water inlet to the water outlet through the water chamber;

a relief valve disposed within the water chamber of the valve member for controlling the water flowing from the water chamber to the water outlet; and a flow speed regulation arrangement which comprise an elongated bleed channel coupling with the valve member, wherein the bleed channel has a first opening communicating with the water inlet and a second opening communicating with the water chamber for controlling a water pressure between the water inlet and the water chamber in a non-adjustable manner, so as to regulate a flow speed of the water entering into the water chamber through the bleed channel.

These and other objectives, features, and advantages of the present invention will become apparent from the following detailed description, the accompanying drawings, and the appended claims.

DETAILED DESCRIPTION OF THE PREFERRED EMBODIMENT

Figure 1:
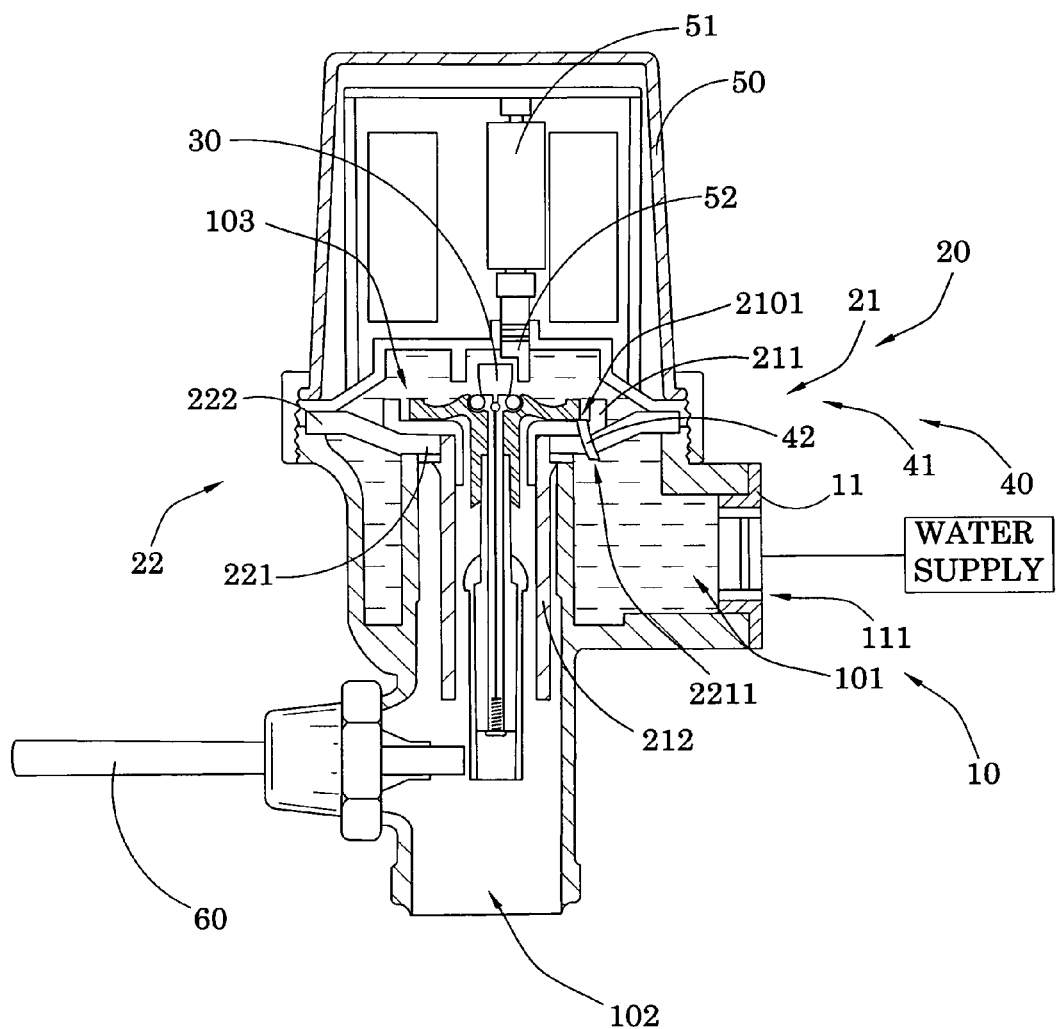
FIG. 1 is a perspective sectional view of a non-adjustable water pressure and flow speed regulating flush system according to a preferred embodiment of the present invention.
Figure 2:
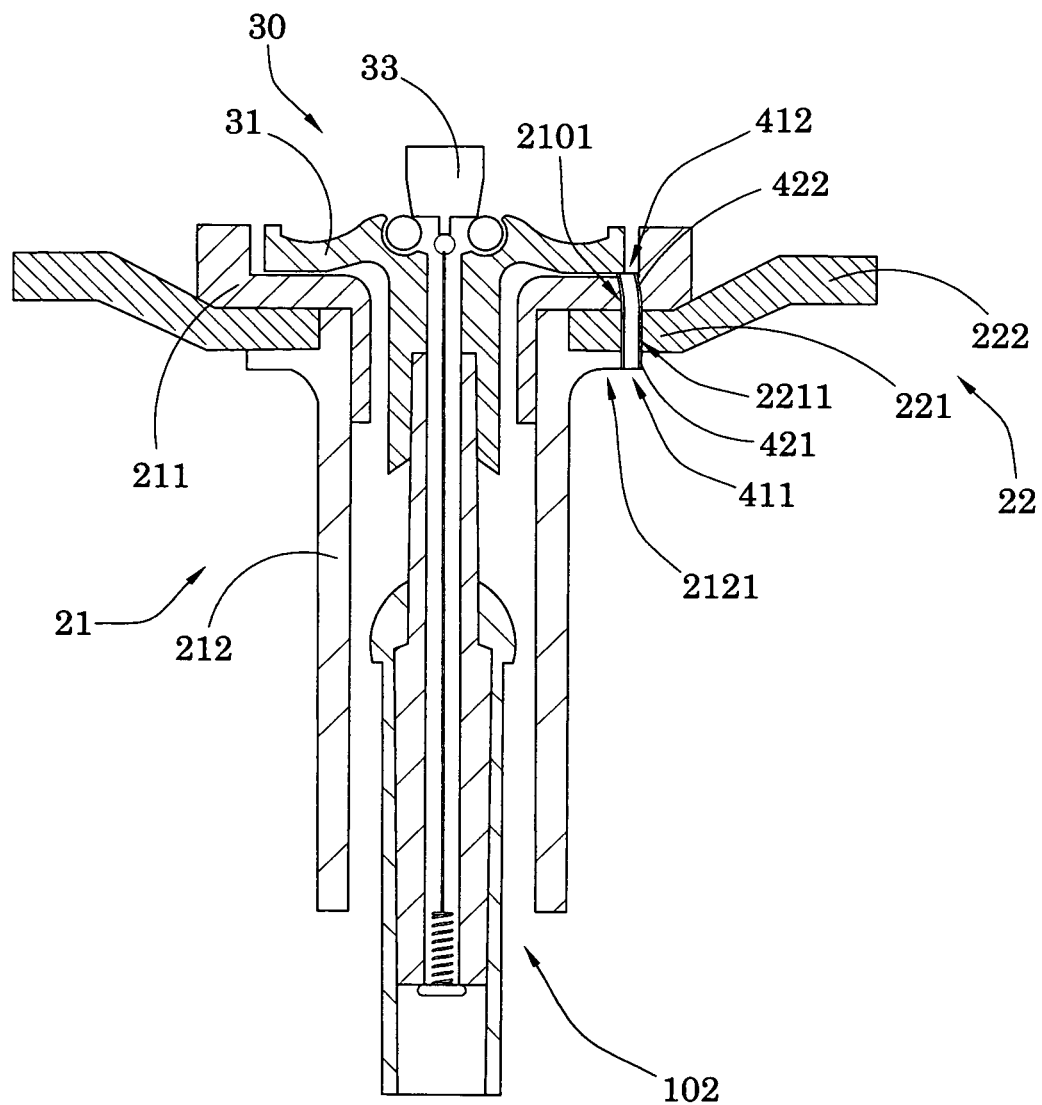
FIG. 2 is a sectional view of a valve member of the non-adjustable water pressure and flow speed regulating flush system according to the preferred embodiment of the present invention, illustrating a relief valve disposed at a valve seat and an elongated bleed channel coupling with the valve member.

Referring to FIGS. 1 to 2 of the drawings, a non-adjustable water pressure and flow speed regulating flush system 10 according to a preferred embodiment of the present invention are illustrated, wherein the flush system 10 having a water inlet 101 and a water outlet 102 and comprises a valve member 20 and a relief valve 30.

The valve member 20 has a water chamber 103 adapted for sealedly disposing between the water inlet 101 and the water outlet 102. The relief valve 30 is disposed at the water chamber 103 for operatively controlling the water flowing from the water inlet 101 to the water outlet 102.

The flush system 10 further comprises a flow speed regulation arrangement 40 for controlling the water flowing from the water inlet 101 to the water chamber 103. The flow speed regulation arrangement 40 comprises an elongated bleed channel 41 coupling with the valve member 20 for regulating the water flow and speed from the water inlet 101 to the water chamber 103, so as to communicate the water inlet 101 with outlet 102 through the water chamber 103.

As shown in FIG. 1, the valve member 20 is adapted for sealedly disposing between the water inlet 101 and the water outlet 102 to control water flowing from the water inlet 101 to the water outlet 102 through the water chamber 103.

Accordingly, the valve member 20 comprises a sealing diaphragm 22 movably sealing at the water chamber 103 for normally blocking the water flowing from the water chamber 103 to the water outlet 102, and a valve seat 21 supporting the sealing diaphragm 22 at the water chamber 103. In addition, the valve seat 21 has a guiding slot 2101 for guiding the bleed channel 41 extended between the water inlet 101 and the water chamber 103, so as to retain the bleed channel 41 in position.

The sealing diaphragm 22 has a center immovable portion 221 coaxially coupling with the valve seat 21 for retaining the sealing diaphragm 22 in position, and an outer peripheral movable portion 222 sealing and sitting within the water chamber 103, in such manner that the sealing diaphragm 22 of the valve member 20 controls the water pressure between the water inlet 101 and the water chamber 103. It is worth to mention that the sealing diaphragm 22 is made of flexible material, such as rubber, to enable the sealing diaphragm 22 to move for balancing the water pressure between the water chamber 103 and the water inlet 101.

The valve seat 21 further comprises a sealing platform 211 for coaxially supporting the center immovable portion 221 of the sealing diaphragm 22 so as to retain the sealing diaphragm 22 in position, and a valve barrel 212 downwardly extended from the sealing platform 211 toward the water outlet 102 to communicate the water chamber 103 with water outlet 102. The relief valve 30 is retained in position by the sealing platform 211 to controllably communicate the water chamber 103 with water outlet 102, such that the relief valve 30 is being actuated to allow the water in the water chamber 103 passing through the valve barrel 212 to the water outlet 102 for being used in a flushing cycle. Accordingly, since the center immovable portion 221 of the sealing diaphragm 22 is affixed to the valve seat 21, the center immovable portion 221 of the sealing diaphragm 22 is restricted to move by its flexibility. However, the outer peripheral movable portion 222 of the sealing diaphragm 22 can be moved by its flexibility to balance the water pressure between the water chamber 103 and the water inlet 101.

According to the preferred embodiment, the relief valve 30 can be actuated automatically by a powering assembly 50 which comprises a power generator 51 and an actuator 52 driven by the power generator 51 to move the relief valve 30 between a closed position and an opened position in responsive to a presence of a user. The relief valve 30 also can be actuated manually by a handle actuator 60. As shown in FIGS. 1 and 2, the relief valve 30 comprises a sealing seat 31 sitting on the sealing platform 211, a valve controlling shaft 32 coaxially extended from the sealing seat 31 to coaxially encircle within the valve barrel 212, and a valve stopper 33 movably sat at the sealing seat 31. In addition, the sealing platform 211 has an indented seating portion for the sealing seat 31 being held therewithin to retain the sealing seat 31 in position.

Accordingly, the powering assembly 50 is activated to actuate the valve stopper 33 for starting the flushing operation in an automatic mode. The handle actuator 60 is actuated to move the valve controlling shaft 32 for starting the flushing operation in a manual mode.

It is worth to mention that the bleed channel 41 of the flow speed regulation arrangement 40 is able to be incorporated with a manual and/or automatic actuated flush system 10 for regulating the water flow and speed of the flush system 10. The relief valve 30 may be manually and/or automatically actuated for allowing the water in the water chamber 103 flowing to the water outlet 102, so as to enforce the water flowing from the water inlet 101 to the water chamber 103 via the decreasing water pressure in the water chamber 103.

As mentioned above, the elongated bleed channel 41 is supported at the valve member 20, wherein the bleed channel 41 has a first opening 411 communicating the water inlet 101 and a second opening 412 communicating the water chamber 103, so that the water pressure between the water inlet 101 and water chamber 103 is controlled through the bleed channel 41, so as to regulate a flow speed of the water entering into the water chamber 103 through the bleed channel 41.

It is worth to mention that the bleed channel 41 has a uniform diameter from the first opening 411 to the second opening 412 having a predetermined length, so that the bleed channel 41 is adapted for controllably regulating the flow speed from the water inlet 101 entering the water chamber 103 via the fixed diameter and predetermined length of the bleed channel 41 in a non-adjustable manner.

Accordingly, when the relief valve 30 is automatically or manually actuated to start the flushing cycle, the water in the water chamber 103 is released to flow to the water outlet 102 via the valve barrel 212 for being used in each flushing cycle. Meanwhile, the water pressure in the water chamber 103 is released by allowing the water flowing from the water chamber 103 to the water outlet 102, so that the water pressure in the water inlet 101 is greater than that of the water chamber 103. Thus, when the relief valve 30 is being actuated to start the flushing cycle, the water is automatically flowing from the water inlet 101 to the water chamber 103 via the bleed channel 41 of flow speed regulation arrangement 40 due to the different the water pressure at the water chamber 103 and the water inlet 101.

In other words, the sealing diaphragm 22 of the valve member 20 is sealedly disposed within the water inlet 101 in a movable manner to define the water chamber 103 above the sealing diaphragm 22 to communicate between the water inlet 101 and outlet 102 through the bleed channel 41. Once the water within the water chamber 103 is released to reduce the water pressure therein, the sealing diaphragm 22 is force to bend or pop upwardly so that the water is capable of passing from the water inlet 101 to the water outlet 102 to complete the flushing cycle of the flush system 10.

Therefore, the water is flowed into the water chamber 103 from the water inlet 101 through the bleed channel 41 on the valve member 20 in such a manner that the water within the water chamber 103 provides a predetermined water pressure against the sealing diaphragm 22 until the water pressure within the water chamber 103 balances with the water pressure at the water inlet 101.

As shown in FIG. 1, the flush system 10 further comprises a water pressure balancer 11 coupled at the water inlet 101 for balancing a water pressure between the water inlet 101 and the water source. Accordingly, the water source is operatively coupled at the water inlet 101 of the flush system 10 for supplying water thereto. When the water enters into the water inlet 101 of the flush system 10, the water pressure at the water source may not be the same water pressure at the water inlet 101. In other words, the water source may supply the water with an irregular water pressure so as to affect the water pressure at the water chamber 103 via the bleed channel 41.

Figure 7:
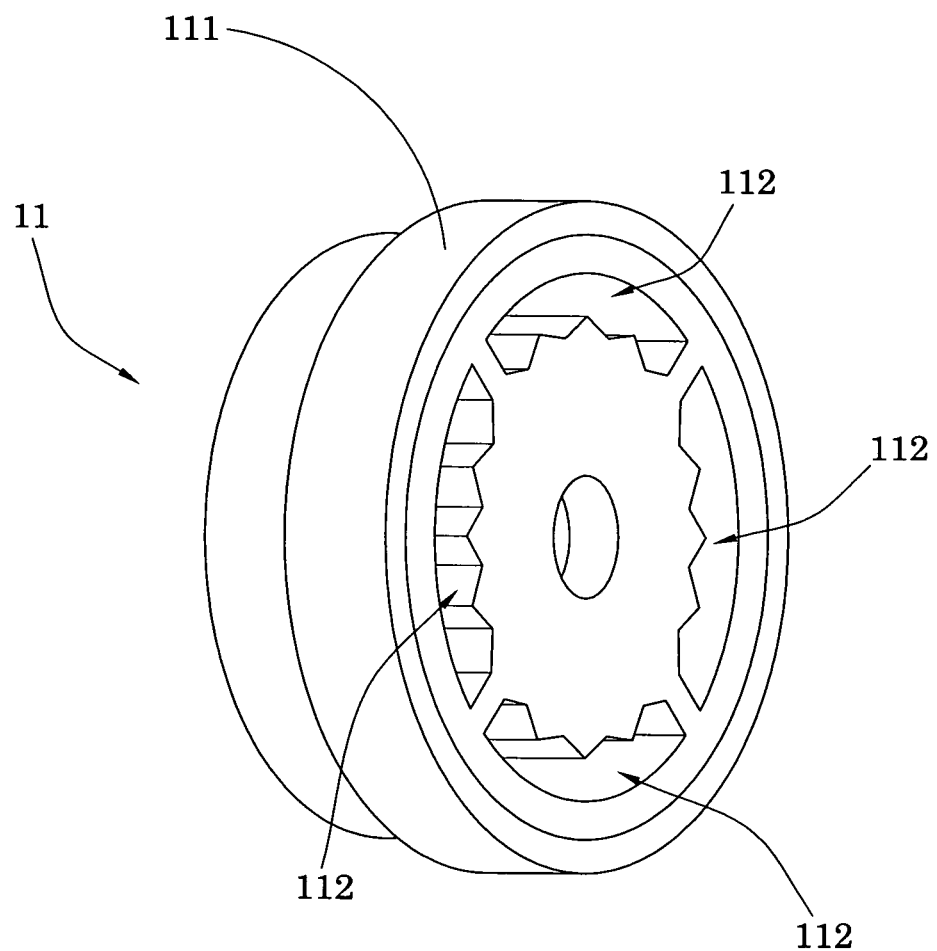
FIG. 7 is a perspective view of the water pressure balancer of the flush system according to the preferred embodiment of the present invention.

As shown in FIG. 7, the water pressure balancer 11 comprises a coupling member 111 coupling at an opening of the water inlet 101 and has a plurality of through water passages 112 spacedly formed at the coupling member 111 for the water entering into the water inlet 101 through the water passages 112. Therefore, the water passages 112 will regulate the water pressure within the water inlet 101 to retain a constant water pressure thereat. Therefore, the water pressure at the water chamber 103 will be effectively adjusted in responsive to the water pressure at the water inlet 101 through the water bleed 41.

Accordingly, the first opening 411 of the bleed channel 41 is preferably extended through the center immovable portion 221 of the sealing diaphragm 22 to communicate with the water inlet 101, and the second opening 412 of the bleed channel 41 is extended through the sealing platform 211 of the valve seat 21 to communicate with the water chamber 103.

In other words, the sealing diaphragm 22 further has a sealing hole 2211 formed at the center immovable portion 221 to align with the guiding slot 2101 extended through the sealing platform 211 of the valve seat 21, such that the first opening 411 of the bleed channel 41 is extended from the guiding slot 2101 through the sealing hole 2211 at the center immovable portion 221 of the sealing diaphragm 22 to communicate with the water inlet 101.

The bleed channel 41 further comprises an elongated water conduit 42, having a predetermined length and fixed uniform diameter between the first opening 411 and second opening 412, so as for extending through the center immovable portion 221 of the sealing diaphragm 22 and the sealing platform 211 of the valve seat 21 of the valve member 20 to communicate between the water inlet 101 and water chamber 103 for balancing the water pressure therebetween.

The water conduit 42 has a first end portion 421 to define the first opening 411 thereat and to extend within the water inlet 101, and a second end portion 422 to define the second opening 412 thereat and to extend within the water chamber 103, such that the water flow is regulated via the water conduit 42 communicating between the water inlet 101 and water chamber 103. As shown in FIG. 2, the first end portion 421 of the water conduit 42 is extended below the center immovable portion 221 of the sealing diaphragm 22 to communicate with the water inlet 101. The second end portion 422 of the water conduit 42 is extended above the wall of the sealing platform 211 at the seating portion thereof to communicate with the water chamber 103.

Accordingly, the water conduit 42 is permanently affixed to the valve member 20 in a non-replaceable manner, such that the water flow pressure and flow speed of the water from the water inlet 101 to the water chamber 103 is regulated in a non-adjustable manner. It is appreciated that the water conduit 42 can be integrally coupled with the valve member 20 to prevent the water conduit 42 from being replaced intentionally.

It is worth mentioning that the center immovable portion 221 of the sealing diaphragm 22 and the sealing platform 211 of the valve seat 21 are remaining at their original positions while the outer peripheral movable portion 222 of sealing diaphragm 22 is moving downwardly and upwardly in responsive to the changing of water pressures of the water inlet 101 and water chamber 103, such that the durability of bleed channel 41 and the water conduit 42 coupling with the valve member 20 are prolonged, so as to enhance the durability of the valve member 20.

A peripheral edge of the valve barrel 212, where the center immovable portion 221 of the sealing diaphragm 22 is affixed thereto, has a through channel 2121 aligning with the sealing hole 2211, so that the bleed channel 41 is guided to extended from the guiding slot 2101 to the through channel 2121 of the valve barrel 212 through the sealing hole 2211 at the center immovable portion 221 of the sealing diaphragm 22. In other words, the second end portion 422 of the water conduit 42 is held at the through channel 2121 of the valve barrel 212.

It is appreciated that the uniform diameter of the water conduit 42 is specifically for a certain model of flush system 10, and fixedly provided for coupling with the valve member, so that after the life period of the valve member 20, it has to be replaced by another new valve member 20 having the same size diameter and predetermined length bleed channel 41 and conduit channel 42 from the original manufacture.

As described above, the bleed channel 41 is extended in a spiral configuration adapted for restricting the flow speed from the water inlet 101 to the water chamber 103, so as to reduce the impact force of water inletting from the water inlet 101 to the water chamber 103. The water conduit 42 further has a curved configuration in accordance with the configuration of the bleed channel 41 for reducing the inletting flow speed to the water chamber 103, so as to extend the life of valve member 20. Therefore, when the water passes through the water conduit 42 from the first opening 411 to the second opening 412, the water is guided to flow in a spiral form within the water chamber 103 so as to restrict the inletting speed of the water at the first opening 411 of the water conduit 42 for avoiding the over-flush of the system.

Accordingly, the relief valve 30 is being actuated to start the flushing cycle by allowing the water flowing from the water chamber 103 to the water outlet 102, and the water at the water inlet 101 is entering to the water chamber 103 by the different water pressure therebetween through the elongated bleed channel 41, so as to regulate the water flow and speed of the flush system 10 in the non-adjustable manner. The bleed channel 41 extended from the sealing platform 211 of the valve seat 21 to the center immovable portion 221 is adapted for adjusting the water flow and speed in a non-movable and non-adjustable manner, while the outer peripheral movable portion 222 is downwardly and upwardly bended to adjust the water pressure between the water inlet 101 and water chamber 103.

Figure 3:
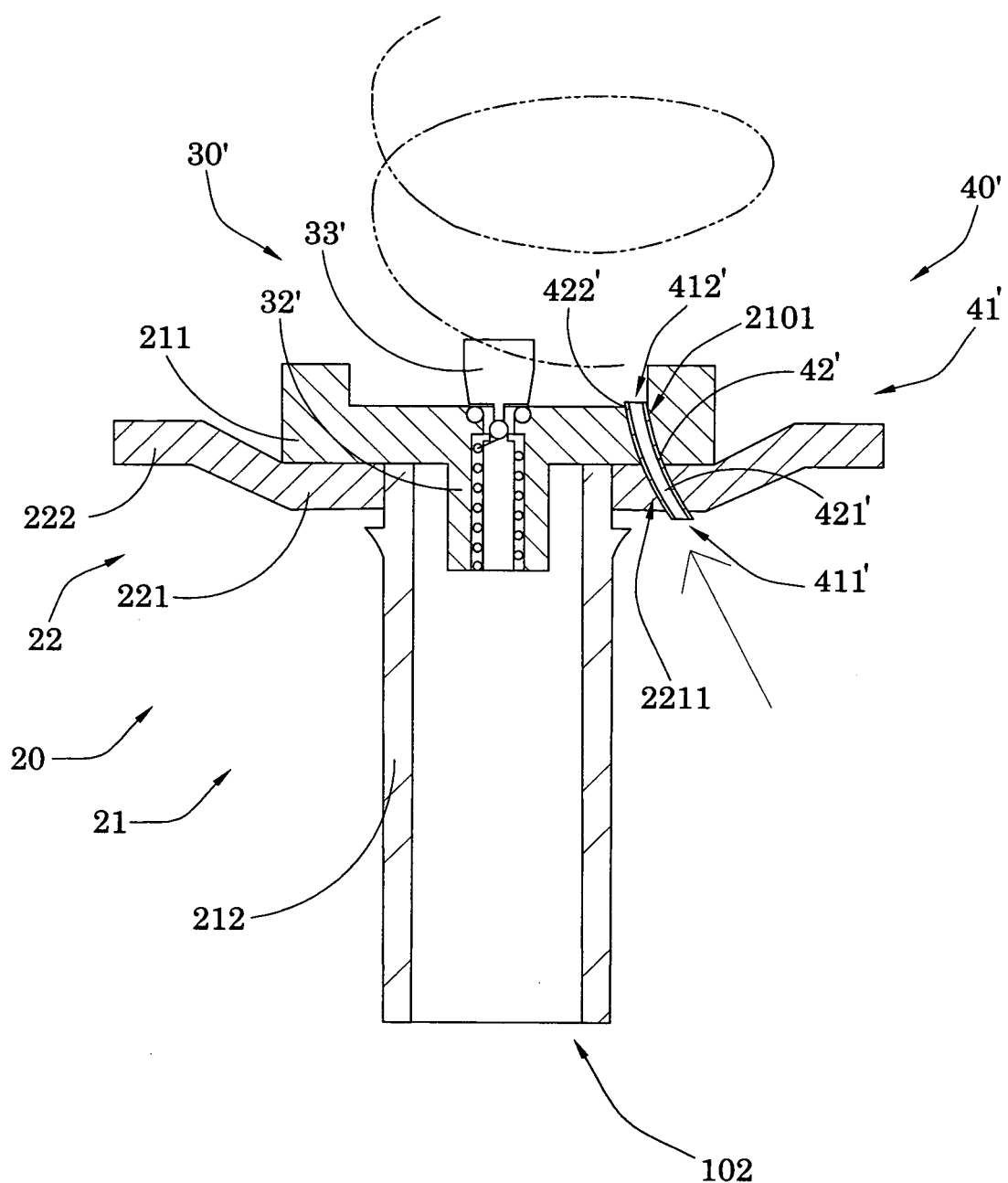
FIG. 3 is a top perspective view the first alternative mode of non-adjustable water pressure and flow speed regulating flush system according to the preferred embodiment of the present invention.
Figure 4:
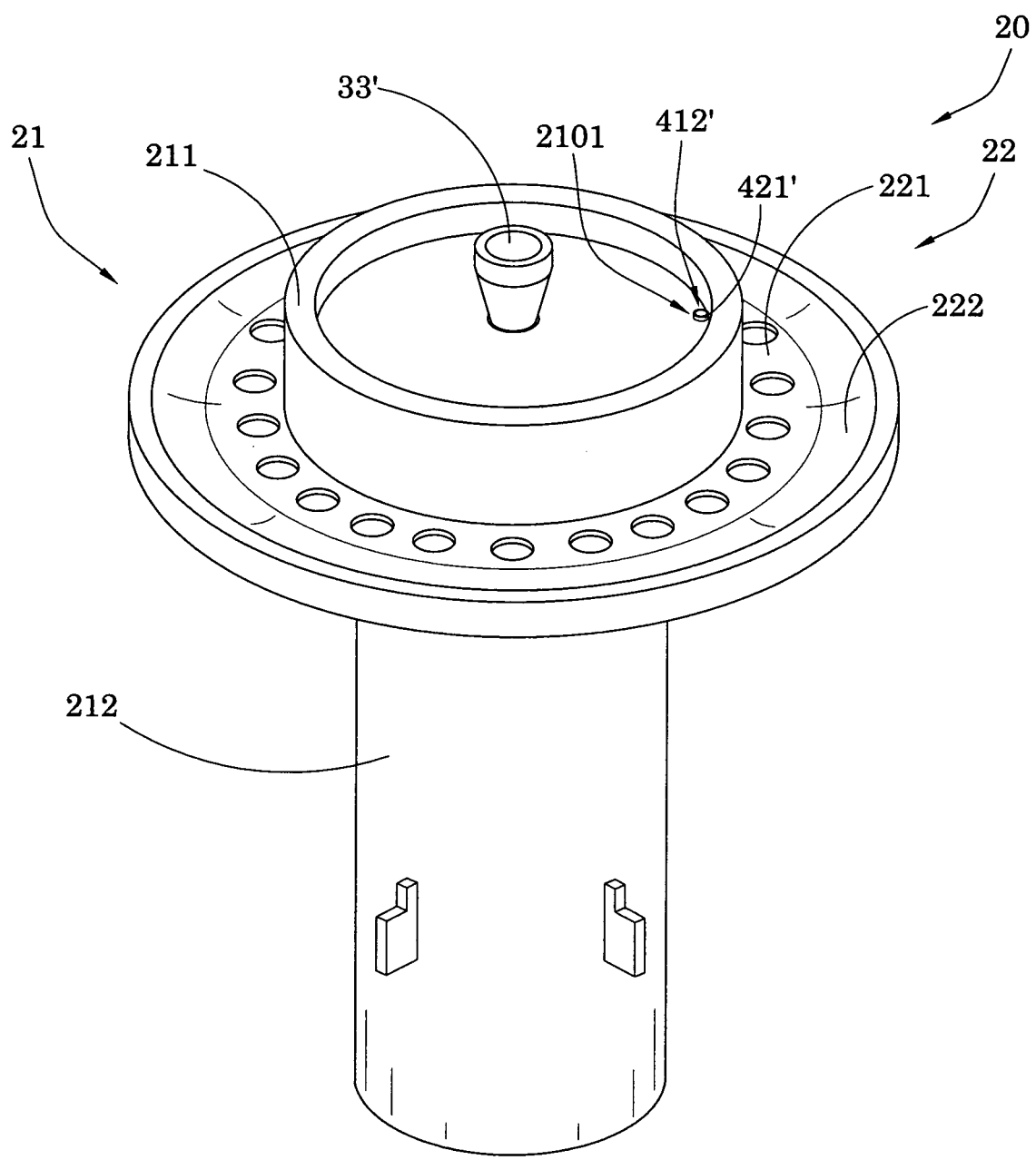
FIG. 4 is a bottom perspective view of the first alternative mode of the non-adjustable water pressure and flow speed regulating flush system according to the preferred embodiment of the present invention.
Figure 5:
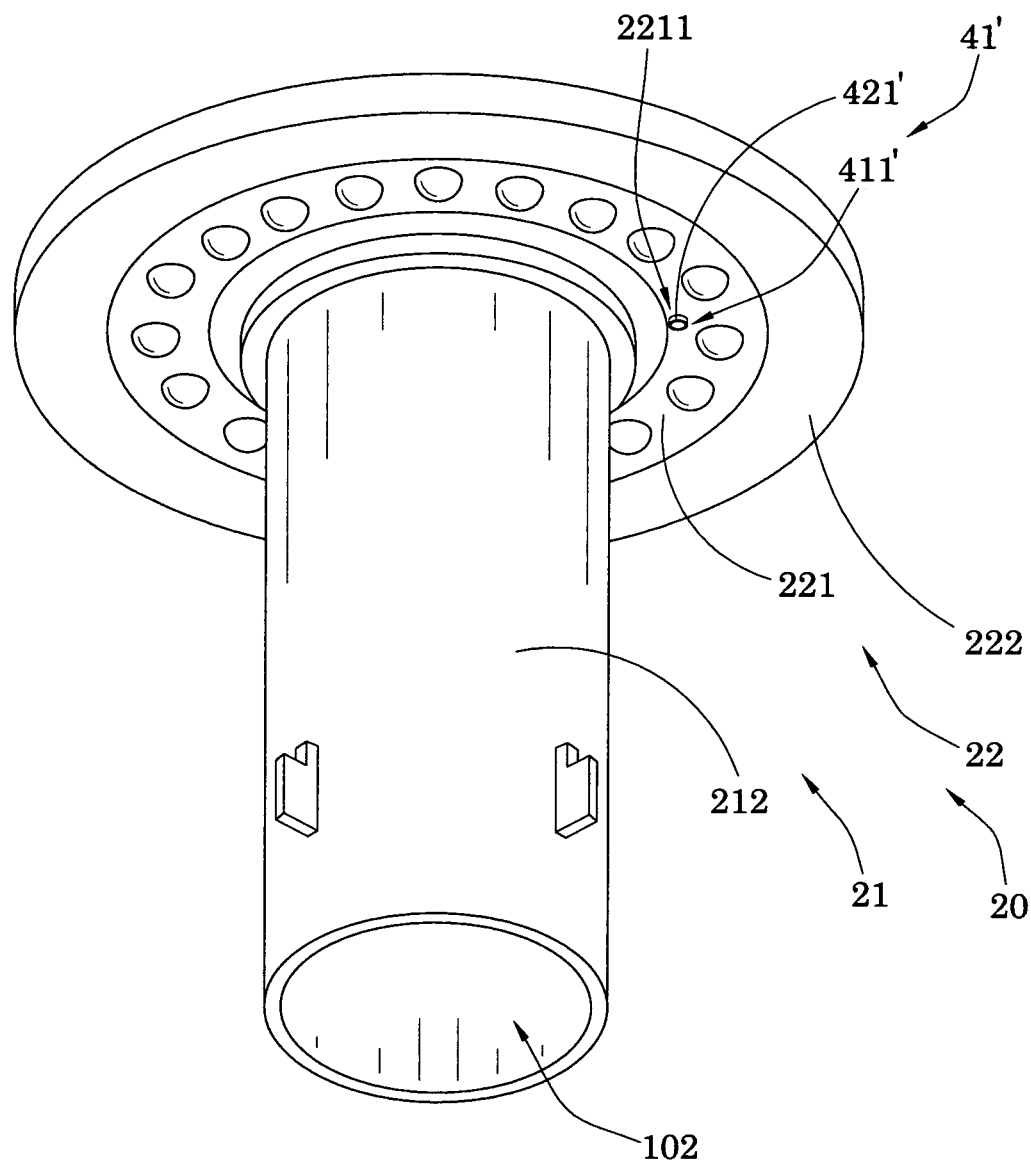
FIG. 5 is a sectional view of the first alternative mode of the non-adjustable water pressure and flow speed regulating flush system according to the preferred embodiment of the present invention.

Referring to FIGS. 3 to 5 of the drawings, an alternative of non-adjustable water pressure and flow speed regulating flush system 40' according to the preferred embodiment of the present invention is illustrated, wherein the relief valve 30' is actuated by the powering assembly 50.

As shown in FIG. 3, the relief valve 30' comprises a valve controlling shaft 32' coaxially and integrally extended from the sealing platform 211 to coaxially encircle within the valve barrel 212, and a valve stopper 33' movably sat at the sealing platform 211. In addition, the sealing platform 211 has an indented seating portion for the valve stopper 33' being held therewithin to retain the valve stopper 33' in position. Accordingly, the powering assembly 50 is activated to actuate the valve stopper 33' for starting the flushing operation in an automatic mode.

As shown in FIGS. 3 to 5, the flow speed regulation arrangement 40' comprises an elongated bleed channel 41' coupling with the valve member 20.

The elongated bleed channel 41' has a first opening 411' extended to communicate with the water inlet 101 and a second opening 412' extended to communicate with the water chamber 103. The center immovable portion 221 of the sealing diaphragm 22 further has a sealing hole 2211 aligning with the guiding slot 2101. The bleed channel 41' is guided to extended from the guiding slot 2101 to the sealing hole 2211 at the center immovable portion 221 of the sealing diaphragm 22.

Accordingly, the elongated bleed channel 41' is extended from the sealing platform 211 to the valve barrel 212 of the valve seat 21 to communicate the water chamber 103 with the water inlet 101. The water flow and speed inletting from the water inlet 101 to the water chamber 103 is therefore controlled by the bleed channel 41' in a non-adjustable manner.

The bleed channel 41', having a uniform diameter from the first opening 411' to the second opening 412', also comprises a water conduit 42' defining the bleed channel 41' therewithin for communicating the water inlet 101 with the water chamber 103, wherein the water conduit 42' has a first end portion 421' extended to the water inlet 101 through the through channel 2121 of the valve barrel 212 to define the first opening 411' thereat, and a second end portion 422' extended to the water chamber 103 through the guiding slot 2101 via the sealing hole 2211 to define the second opening 412' thereat.

As shown in FIG. 5, the first end portion 421' of the water conduit 42' is extended below the center immovable portion 221 of the sealing diaphragm 22 to communicate with the water inlet 101. The second end portion 422' of the water conduit 42' is extended above the wall of the sealing platform 211 at the seating portion thereof to communicate with the water chamber 103.

Therefore, the water conduit 42' are extended in a non-movable portion from the valve barrel 212 to the sealing platform 211 of the valve seat 21 through the center immovable portion 221 of the sealing diaphragm 22, so as to non-adjustably control the water flowing form the water inlet 101 to the water chamber 103 via the non-movable bleed channel 41'. In other words, the difference between the first and second embodiments is that the through channel 2121 is formed at the peripheral edge of the valve barrel 212 of the valve member 20 to guide and retain the bleed channel 41' in position.

It is appreciated that the non-movable bleed channel 41' and the water conduit 42' are able to prolong the life and enhance the durability of the valve member 20. The water conduit 42' is preferably made by a relatively more rigid material, so as to prevent the deformation of the bleed channel 41' via the water conduit 42'.

Figure 6:
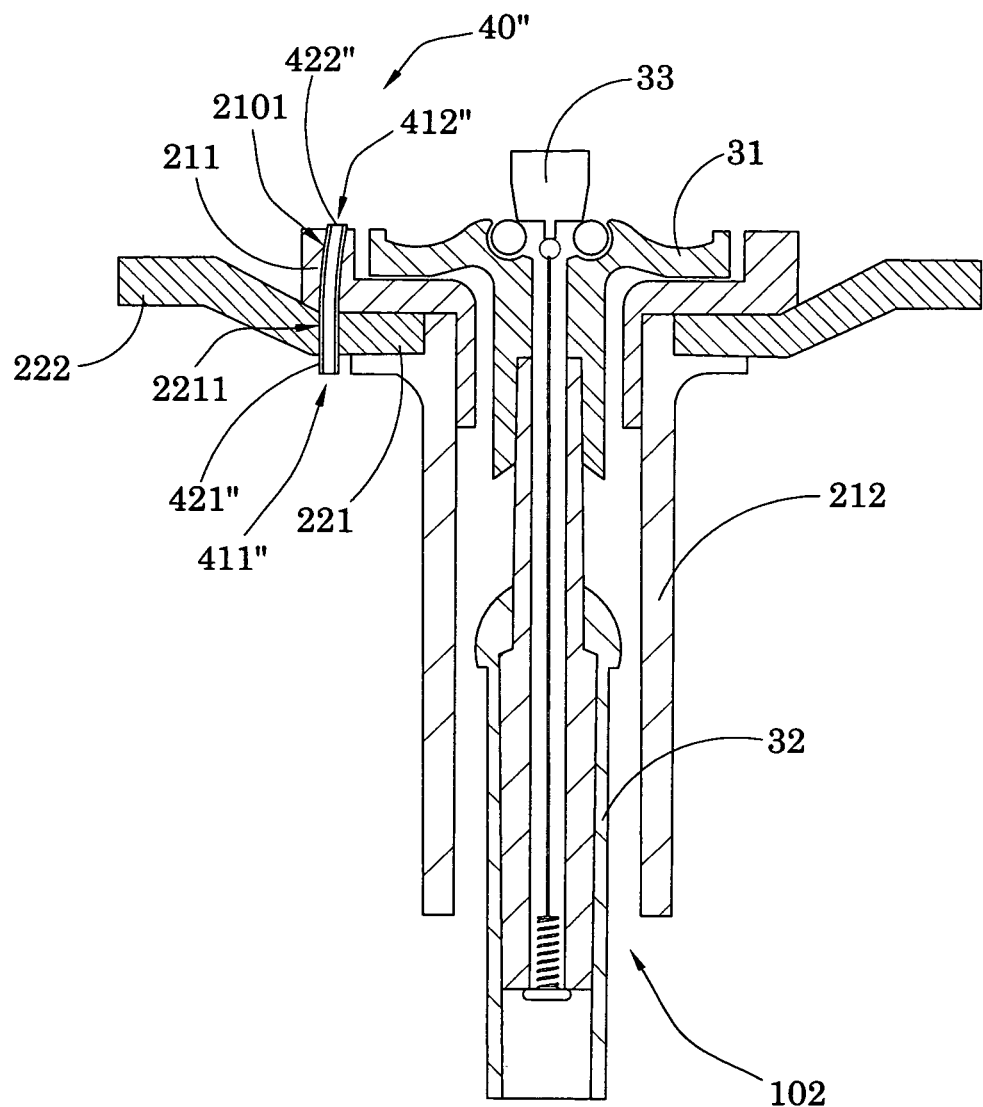
FIG. 6 illustrates a second alternative mode of the non-adjustable water pressure and flow speed regulating flush system according to the preferred embodiment of the present invention.

FIG. 6 illustrates another alternative mode of the non-adjustable water pressure and flow speed regulating flush system 40", which comprises an elongated bleed channel 41" coupling with the valve member 20.

The elongated bleed channel 41" has a first opening 411" extended to communicate with the water inlet 101 and a second opening 412" extended to communicate with the water chamber 103. The center immovable portion 221 of the sealing diaphragm 22 further has a sealing hole 2211 aligning with the guiding slot 2101. The bleed channel 41" is guided to extended from the guiding slot 2101 to the sealing hole 2211 at the center immovable portion 221 of the sealing diaphragm 22.

The bleed channel 41", having a uniform diameter from the first opening 411" to the second opening 412", also comprises a water conduit 42" defining the bleed channel 41" therewithin for communicating the water inlet 101 with the water chamber 103, wherein the water conduit 42" has a first end portion 421" extended to the water inlet 101 through the through channel 2121 of the valve barrel 212 to define the first opening 411" thereat, and a second end portion 422" extended to the water chamber 103 through the guiding slot 2101 via the sealing hole 2211 to define the second opening 412" thereat.

Accordingly, the first end portion 421" of the water conduit 42" is extended below the center immovable portion 221 of the sealing diaphragm 22 to communicate with the water inlet 101. The second end portion 422" of the water conduit 42" is extended above the wall of the sealing platform 211 to communicate with the water chamber 103. It is worth mentioning that the second end portion 422" of the water conduit 42" is extended through the peripheral edge portion of the sealing platform 211. The seating portion of the sealing platform 211 is defined within the peripheral edge portion thereof such that the thickness of the peripheral edge portion of the sealing platform 211 is larger than the thickness of the seating portion of the sealing platform 211 as shown in FIG. 6. Accordingly, the peripheral edge portion of the sealing platform 211 with the thicker configuration will further retain the water conduit 42" securely.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A non-adjustable water pressure and flow speed regulating flush system having a water inlet and a water outlet, comprising:
   a valve member adapted for sealedly disposing between said water inlet and said water outlet to define a water chamber, wherein said valve member comprises:
   a valve seat which comprises a sealing platform and a valve barrel downwardly extended from said sealing platform toward said water outlet for communicating said water chamber with said water outlet; and
   a sealing diaphragm sealed at said water chamber, wherein said sealing diaphragm has a center immovable portion affixed at said sealing platform to restrict said center immovable portion to be moved by its flexibility and an outer peripheral movable portion sealed at and sat within said water chamber, such that said outer peripheral movable portion is adapted to be moved by its flexibility;
   a relief valve disposed within said water chamber of said valve member for controlling said water flowing from said water chamber to said water outlet, wherein said relief valve comprises a sealing seat sitting on said sealing platform, a valve controlling shaft coaxially extended from said sealing seat to coaxially encircle within said valve barrel, and a valve stopper movably sat at said sealing seat; and
   a flow speed regulation arrangement which comprises an elongated bleed channel coupling with said center immovable portion of said sealing diaphragm, wherein said bleed channel, which is a curved channel, has a first opening extended through said center immovable portion of said sealing diaphragm for communicating with said water inlet and a second opening extended through said sealing platform for communicating with said water chamber to control a water pressure between said water inlet and said water chamber in a non-adjustable manner, so as to regulate a flow speed of said water entering into said water chamber through said bleed channel, wherein said bleed channel comprises an elongated water conduit having a predetermined length between said first and second openings and extending through said center immovable portion of said sealing diaphragm to communicate between said water inlet and said water chamber for balancing said water pressure therebetween.

2. The system, as recited in claim 1, wherein said valve seat further has a guiding slot guiding said bleed channel to extend between said water inlet and said water chamber so as to retain said bleed channel in position.

3. The system, as recited in claim 2, wherein said sealing platform has a peripheral edge portion and a center indented seating portion that said sealing seat is held therewithin to retain said seating seat in position, wherein said center immovable portion of said sealing diaphragm is affixed to said peripheral edge portion and said center indented seating portion of said sealing platform.

4. The system, as recited in claim 3, wherein said water conduit has a first end portion defining said first opening thereat and extending within said water inlet, and a second end portion defining said second opening thereat and extending within said water chamber.

5. The system, as recited in claim 4, wherein said second end portion of said water conduit is extended above a wall of said sealing platform at said center indented seating portion thereof to communicate with said water chamber.

6. The system, as recited in claim 5, wherein said bleed channel has a fixed uniform diameter between said first and second openings for controlling said water pressure between said water inlet and said water chamber in a non-adjustable manner.

7. The system, as recited in claim 6, wherein said bleed channel is extended in a spiral configuration from said water inlet to said water chamber for restricting an inletting flow speed of said water from said inlet to said water chamber.

8. The system, as recited in claim 7, wherein said sealing diaphragm further has a sealing hole formed at said center immovable portion to align with said guiding slot such that said first opening of said bleed channel is extended from said guiding slot through said sealing hole to communicate with said water inlet.

9. The system, as recited in claim 4, wherein said second end portion of said water conduit is extended above a wall of said sealing platform at said peripheral edge portion thereof to communicate with said water chamber.

10. The system, as recited in claim 9, wherein said bleed channel has a fixed uniform diameter between said first and second openings for controlling said water pressure between said water inlet and said water chamber in a non-adjustable manner.

11. The system, as recited in claim 10, wherein said bleed channel is extended in a spiral configuration from said water inlet to said water chamber for restricting an inletting flow speed of said water from said inlet to said water chamber.

12. The system, as recited in claim 11, wherein said sealing diaphragm further has a sealing hole formed at said center immovable portion to align with said guiding slot such that said first opening of said bleed channel is extended from said guiding slot through said sealing hole to communicate with said water inlet.

13. The system, as recited in claim 1, wherein said sealing platform has a peripheral edge portion and a center indented seating portion that said sealing seat is held therewithin to retain said seating seat in position, wherein said center immovable portion of said sealing diaphragm is affixed to said peripheral edge portion and said center indented seating portion of said sealing platform.

14. The system, as recited in claim 1, wherein said water conduit has a first end portion defining said first opening thereat and extending within said water inlet, and a second end portion defining said second opening thereat and extending within said water chamber.

15. The system, as recited in claim 1, wherein said bleed channel has a fixed uniform diameter between said first and second openings for controlling said water pressure between said water inlet and said water chamber in a non-adjustable manner.

16. The system, as recited in claim 1, wherein said bleed channel is extended in a spiral configuration from said water inlet to said water chamber for restricting an inletting flow speed of said water from said inlet to said water chamber.

17. The system, as recited in claim 1, wherein said sealing diaphragm further has a sealing hole formed at said center immovable portion to align with said guiding slot such that said first opening of said bleed channel is extended from said guiding slot through said sealing hole to communicate with said water inlet.

18. A method of regulating a water flow of a flush system having a water outlet and a water inlet, comprising the steps of:
   (a) sealedly disposing a valve member between said water inlet and said water outlet to define a water chamber, wherein said valve member comprises a valve seat and a sealing diaphragm, wherein said valve seat comprises a sealing platform and a valve barrel downwardly extended from said sealing platform toward said water outlet for communicating said water chamber with said water outlet, wherein said sealing diaphragm is sealed at said water chamber, wherein said sealing diaphragm has a center immovable portion affixed at said sealing platform to restrict said center immovable portion to be moved by its flexibility and an outer peripheral movable portion sealed at and sat within said water chamber, such that said outer peripheral movable portion is adapted to be moved by its flexibility;
   (b) disposing a relief valve within said water chamber of said valve member for controlling said water flowing from said water chamber to said water outlet, wherein said relief valve comprises a sealing seat sitting on said sealing platform, a valve controlling shaft coaxially extended from said sealing seat to coaxially encircle within said valve barrel, and a valve stopper movably sat at said sealing seat; and
   (c) configuring an elongated and curved bleed channel at said center immovable portion of said sealing diaphragm, wherein said bleed channel has a first opening extended through said center immovable portion of said sealing diaphragm for communicating with said water inlet and a second opening extended through said sealing platform for communicating with said water chamber to control a water pressure between said water inlet and said water chamber in a non-adjustable manner, so as to regulate a flow speed of said water entering into said water chamber through said bleed channel.

19. The method, as recited in claim 18, wherein the step (c) further comprises the steps of:
   (c.1) extending a first end portion of said water conduit within said water inlet to define said first opening at said first end portion; and
   (c.2) extending a second end portion of said water conduit within said water chamber to define said second opening at said second end portion.

20. The method, as recited in claim 19, wherein the step (a) further comprises a step (a.1) of providing a guiding slot at said valve seat for guiding said bleed channel to extend between said water inlet and said water chamber so as to retain said bleed channel in position.

21. The method, as recited in claim 20, wherein the step (a) further comprises the steps of:
   (a.2) configuring said sealing platform to have a peripheral edge portion and a center indented seating portion that said sealing seat is held therewithin to retain said seating seat in position;
   (a.3) extending said second end portion of said water conduit above a wall of said sealing platform at said center indented seating portion thereof to communicate with said water chamber.

22. The method, as recited in claim 21, wherein the step (c) further comprises a step of configuring said bleed channel to have a fixed uniform diameter between said first and second openings for controlling said water pressure between said water inlet and said water chamber in a non-adjustable manner.

23. The method, as recited in claim 22, wherein the step (c) further comprises a step of configuring said bleed channel to extend in a spiral configuration from said water inlet to said water chamber for restricting an inletting flow speed of said water from said inlet to said water chamber.

24. The method, as recited in claim 23, wherein the step (a) further comprises a step of forming sealing hole at said center immovable portion of said sealing diaphragm to align with said guiding slot such that said first opening of said bleed channel is extended from said guiding slot through said sealing hole to communicate with said water inlet.

25. The method, as recited in claim 20, wherein the step (a) further comprises the steps of:
   (a.2) configuring said sealing platform to have a peripheral edge portion and a center indented seating portion that said sealing seat is held therewithin to retain said seating seat in position;
   (a.3) extending said second end portion of said water conduit above a wall of said sealing platform at said peripheral edge portion thereof to communicate with said water chamber.

26. The method, as recited in claim 25, wherein the step (c) further comprises a step of configuring said bleed channel to have a fixed uniform diameter between said first and second openings for controlling said water pressure between said water inlet and said water chamber in a non-adjustable manner.

27. The method, as recited in claim 26, wherein the step (c) further comprises a step of configuring said bleed channel to extend in a spiral configuration from said water inlet to said water chamber for restricting an inletting flow speed of said water from said inlet to said water chamber.

28. The method, as recited in claim 27, wherein the step (a) further comprises a step of forming sealing hole at said center immovable portion of said sealing diaphragm to align with said guiding slot such that said first opening of said bleed channel is extended from said guiding slot through said sealing hole to communicate with said water inlet.

* * * * *